United States Patent

Gers et al.

[11] Patent Number: 6,061,674
[45] Date of Patent: May 9, 2000

[54] NEUROCELLULAR AUTOMATION AND OPTIMIZER

[75] Inventors: Felix Gers; Hugo de Garis; Hitoshi Hemmi, all of Kyoto, Japan

[73] Assignee: ATR Human Information Processing Research Laboratories, Kyoto, Japan

[21] Appl. No.: 08/944,509

[22] Filed: Oct. 6, 1997

[30] Foreign Application Priority Data

Apr. 7, 1997 [JP] Japan .................................. 9-088250

[51] Int. Cl.[7] .................................................. G06F 15/18
[52] U.S. Cl. ............................. 706/26; 706/15; 706/25
[58] Field of Search .................................. 706/15, 25, 26

[56] References Cited

U.S. PATENT DOCUMENTS

| | | | |
|---|---|---|---|
| 4,809,193 | 2/1989 | Jourjine | 364/513 |
| 5,136,686 | 8/1992 | Koza | 395/13 |
| 5,148,513 | 9/1992 | Koza et al. | 395/13 |
| 5,299,285 | 3/1994 | Tawel | 706/25 |
| 5,321,773 | 6/1994 | Kopec et al. | 382/30 |
| 5,602,964 | 2/1997 | Barrett | 706/25 |
| 5,826,248 | 10/1998 | De Garis et al. | 706/15 |

FOREIGN PATENT DOCUMENTS 7-105164  4/1995  Japan .

*Primary Examiner*—Tariq R. Hafiz
*Assistant Examiner*—Wilbert L. Starks, Jr.
*Attorney, Agent, or Firm*—McDermott, Will & Emery

[57] ABSTRACT

A number of cells each having a state storage mechanism and a state update mechanism are arranged in the form of a grid. The state storage mechanism includes parts opening and closing information to the remaining cells, and the state update mechanism includes open and closed update parts. The state update mechanism decides the next state on the basis of its own cell state and open states of neighboring cells.

9 Claims, 9 Drawing Sheets

NEUROCELLULAR AUTOMATION AND OPTIMIZER

BACKGROUND OF THE INVENTION

1. Field of the Invention

The present invention relates to a neurocellular automaton and an optimizer employing the same. More specifically, the present invention relates to a neurocellular automaton which can flexibly change the number of neurons, the presence/absence of connections between the neurons, and the weight of the connections, in response to problems, and is formed by a readily producible iterative structure, and an optimizer employing the same.

2. Description of the Background Art

Information processing techniques based on artificial neural networks have been developed in recent years. An artificial neural network (hereafter simply referred to as a neural network), which is formed by connecting a number of units (neurons) performing simple and uniform information processing for simulating a cerebral neural network, is expected to allow extremely flexible processing as compared with a general computer.

However, each neuron can perform only simple information processing. In order to apply an artificial neural network to such complicated processing as that performed by an biological cerebral neural network, therefore, it is necessary to interconnect an extremely large number of neurons with each other. However, software simulation of such interconnection on a general computer is much too time-consuming, and hence impractical. In order to perform the processing at high speed, it is indispensable to implement the neural network with hardware such as electronic circuits.

The feature of a neural network resides in its flexibility. This results from the point that the connection strengths between neurons are changeable. Further, this results from simulation of a biological neural network which is formed by protein etc. and is freely transformable or growable.

On the other hand, hardware is formed by solids such as electronic circuits and remains unchangeable after construction, and hence portions requiring regulation must be previously formed by variable devices. However, a large-scale neural network has an extremely large number of regulation points, and in consideration of wires which are necessary therefore, it has proved difficult to previously build all elements in the network.

The inventors have proposed a neural cellular automaton forming a neural network by growing neurons on a cellular automaton and an optimizer employing the same in Japanese Patent Laying-Open 7-105164 (1995; U.S. Ser. No. 08/316,499). The cellular automaton is formed by regularly arranging and connecting a number of cells having simple structure and function with each other, and intercellular interaction is limited to only neighboring cells. Therefore, the cells are extremely small, and can be concentrated due to a small number of long wires. In this sense, the cellular automaton has a structure suitable for implementation as an integrated electronic circuit.

Despite the simplicity of the individual cells and the regularity of the overall structure, the cellular automaton is applicable to extremely complicated information processing as a whole depending on the contrivance, and its application is wide-ranging.

The aforementioned proposed neural cellular automaton is based on a method of employing signal propagation paths consisting of 3-cell wide trails as axons and dendrites of neurons for propagating various signals through the centers thereof, in accordance with the technique by Codd. In this method, however, it is necessary to insert blank cell parts between the signal propagation paths for preventing interference between the signal propagation paths, and hence 25% of the cells do not participate in operations of the neural network on the average. Further, the signal propagation paths are so wide that the density of the network is reduced and the cellular automaton cannot be effectively used.

In the proposed method, further, the signal strength in the neural network is expressed by state difference, and hence the amount of information to be passed between each cell and its neighbors is increased, leading to complication of state update mechanisms of the cells. Thus, the conventional neural network on the cellular automaton has disadvantages of complicated state update mechanisms of cells and inefficient use of the cellular automaton. These disadvantages are reflected as size increase of the cells and low density of the neural network in implementation of a neurocellular automaton with hardware such as electronic circuits, and lead to an increased physical scale of the device or reduction of the function of the neural network.

SUMMARY OF THE INVENTION

Accordingly, a principal object of the present invention is to provide a neurocellular automaton and an optimizer which can simplify state update mechanisms of cells and form a high-density neural network.

Briefly stated, the present invention is directed to a neurocellular automaton provided with a number of cells, each having a state storage mechanism holding a state, which are arranged in the form of a grid. Each cell comprises a state update mechanism updating the next state on the basis of a current state of its own cell which is held in the state storage mechanism and states of neighboring cells while synchronously updating states of all cells. The state storage mechanism includes a closed storage mechanism closing its own state from the remaining cells, and an open state storage mechanism opening its own state to the remaining cells, and the state update mechanism includes closed and open update mechanisms corresponding to the closed and open storage mechanisms respectively, for deciding the next state on the basis of its own cell state and open states of the neighboring cells.

According to the present invention, therefore, unnecessary interference between signal propagation paths can be removed and a neural network can be formed in high density.

According to a preferred embodiment of the present invention, the open state storage mechanism includes a partial storage area storing an open state in correspondence to each of the neighboring cells, and the state update mechanism includes a partial update mechanism performing partial updating in correspondence to the partial storage area, while the partial update mechanism decides the next state on the basis of its own cell state and open states corresponding to its own cell which are stored in the partial storage areas of the neighboring cells.

According to a more preferred embodiment, the cells include a plurality of neuron cells corresponding to bodies of nerve cells and a blank cell causing no generation or the like, a blank state is stored in the state storage mechanism, an axon growth signal or a dendrite growth signal corresponding to an axon or a dendrite of each nerve cell is set in a part of the open state storage mechanism of each neuron cell, and the cell of the blank state receiving the axon or dendrite growth signal from a neighboring cell stores the growth signal from the neighboring cell in the closed state storage mechanism, thereby changing from a blank cell to an axon or dendrite cell in response to the received signal, and setting the received growth signal in the open state storage mechanism for the remaining cells, other than the neighboring cell, in accordance with the previously held growth information.

According to a more preferred embodiment, the cells are classified into a neuron cell, a blank cell, an axon cell and a dendrite cell. The axon cell is in a direction for sending a functional operation signal from the neuron cell, and the dendrite cell collects the functional operation signal toward the neuron cell.

According to a more preferred embodiment, the axon cell has an input gate in a single direction for receiving a signal, and has output gates in all remaining directions for outputting a functional operation signal to each output gate, in response to its own state and a functional operation signal inputted in the input gate. The dendrite cell has an output gate in a single direction for outputting a signal, and has input gates in all remaining directions for outputting a functional operation signal in the single direction in response to its own state and a functional operation signal inputted in each input gate.

According to a more preferred embodiment, the neurocellular automaton has two modes, i.e., a growth mode and a functional operation mode, for classifying the cells into a neuron cell, a blank cell, an axon cell and a dendrite cell in the growth mode, while the axon cell distributes a functional operation signal and the dendrite cell collects a functional operation signal in the functional operation mode.

According to another aspect, the present invention is directed to an optimizer employing a neurocellular automaton which is formed by arranging a plurality of cells in the form of a grid and interconnecting the same with each other to be capable of inputting signals expressing states of neighboring cells in each cell as input signals. Each cell includes a state storage mechanism including open and closed parts of its own cell state and a state update mechanism corresponding to the parts of the state storage mechanism for deciding a next state on the basis of its own cell state and open states of the neighboring cells. The optimizer comprises an input/output part outputting an object problem to the neurocellular automaton and receiving an output result of the neurocellular automaton responsive thereto, an evaluation part comparing the object problem with the output result of the neurocellular automaton for calculating an evaluation value which is the fitness of the neurocellular automaton to the object problem, and an evaluation value reflecting part deciding the next operation in a next state update mechanism in the neurocellular automaton and inputting respective signals expressing the same in the neurocellular automaton, the state storage mechanism and the state update mechanism.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
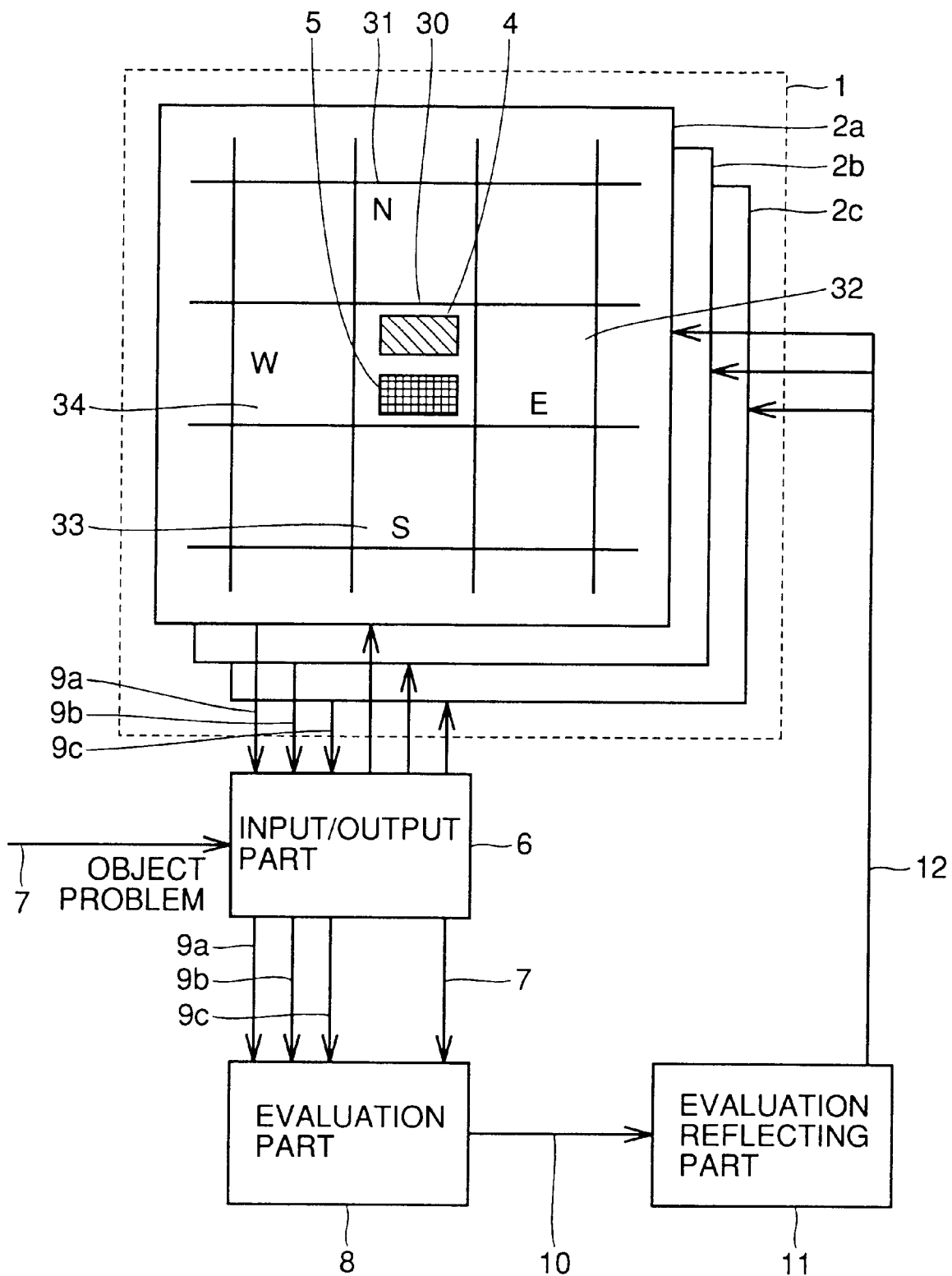
FIG. 1 is a schematic block diagram showing an optimizer employing a neural automaton according to an embodiment of the present invention.

FIG. 1 is a schematic block diagram showing an optimizer employing a neural automaton according to an embodiment of the present invention. Referring to FIG. 1, a cellular automaton 1 is formed by three cellular automata 2a, 2b and 2c. The cellular automata 2a, 2b and 2c are interconnected with each other in the form of a grid, so that each receives states of its own cell 30 and four neighbors, i.e., N (north), E (east), S (south) and W (west) cells 31, 32, 33 and 34 as input signals. Each of the cells 30 to 34 has a state hold mechanism 4 serving as state storage means and a state update mechanism 5 serving as state update means. The state hold mechanism 4 includes a memory storing states for growing each cell and an electronic circuit for rewriting the contents of the memory, and the state update mechanism 5 updates the next state on the basis of the states of its own cell and the neighboring cells.

Figure 2:
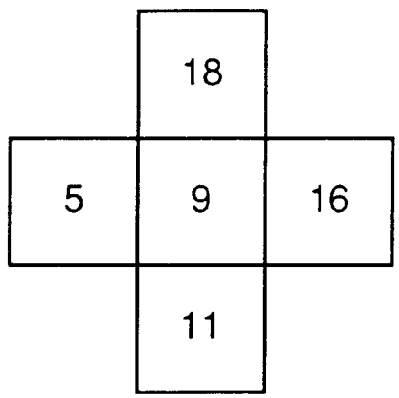
FIG. 2 illustrates the principle of state derivation in each cell of a neural cellular automaton shown in FIG. 1.

FIG. 2 illustrates the principle of state derivation in each cell of the neural cellular automaton shown in FIG. 1. As shown in FIG. 2, the central cell having a current state 9 derives its next state 4 on the basis of its own state 9 and the states 18, 16, 11 and 5 of the N, E, S and W cells. Thus, the state hold mechanism 4 holds states, and the state update mechanism 5 updates the states.

Referring again to FIG. 1, an input/output part 6 is provided for inputting a signal 7 expressing an object problem in the cellular automata 2a, 2b and 2c which are in certain states. The input/output part 6 receives the signal 7 expressing the object problem, outputs the same to the cellular automata 2a, 2b and 2c, and receives signals 9a, 9b and 9c expressing output results of the cellular automata 2a, 2b and 2c which are responsive to the output respectively. An evaluation part 8 is provided for receiving outputs of the input/output part 6, so that the signals 9a, 9b and 9c expressing the output results of the cellular automata 2a, 2b and 2c and the signal 7 expressing the object problem are inputted in this evaluation part 8.

The evaluation part 8 operates the fitness of the signals 9a, 9b and 9c expressing the output results of the cellular automata 2a, 2b and 2c to the object problem 7, and inputs a signal 10 expressing an evaluation value which is the result of the operation in an evaluation reflecting part 11 as an output of the evaluation part 8. The evaluation reflecting part 11 outputs a signal 12 expressing the next initial state of each cellular automaton and the next operations of the state hold mechanism 4 and the state update mechanism 5 based on the inputted signal 10 expressing the evaluation value, for inputting the same in the cellular automata 2a, 2b and 2c respectively.

The aforementioned structure and operations are in common with those of the previously proposed neural cellular automaton. The previously proposed neural cellular automaton and the neural cellular automaton according to the embodiment of the present invention are now described in comparison.

Figure 3A:
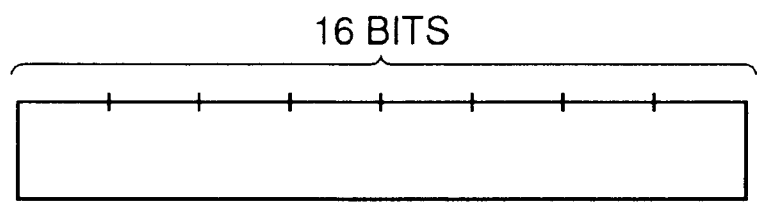
FIGS. 3A and 3B illustrate exemplary state hold mechanisms.
Figure 3B:
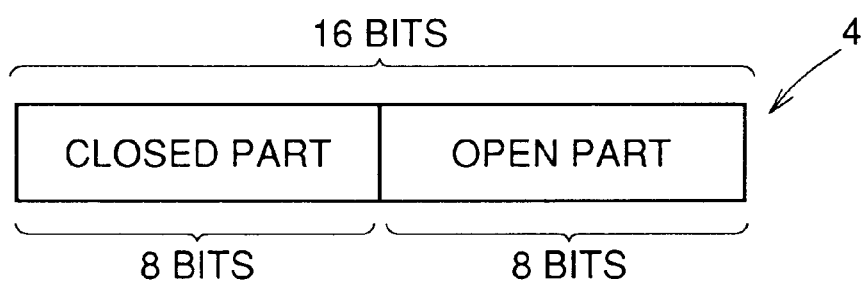
Figures 4A, 4B:
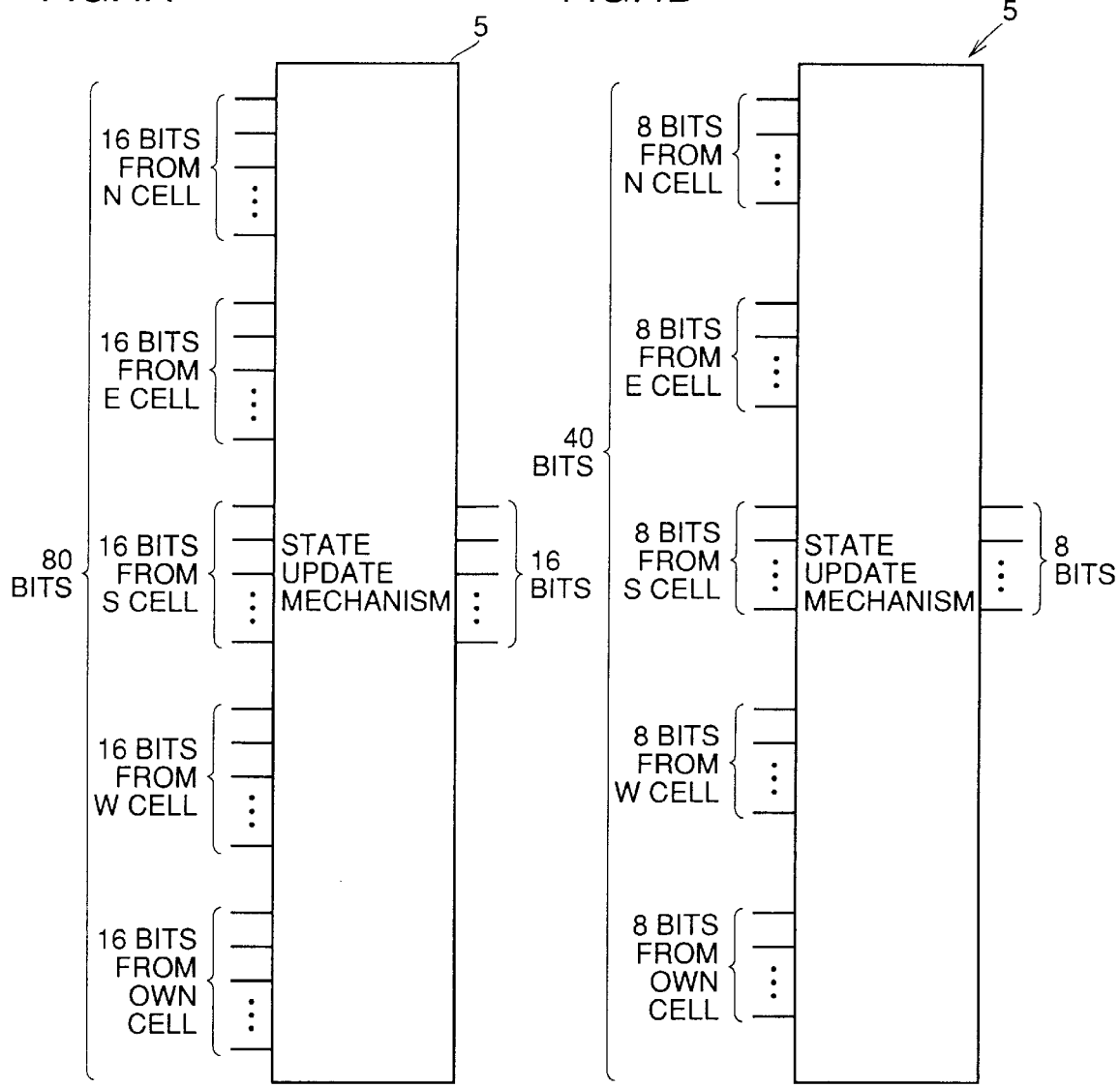
FIGS. 4A and 4B illustrate exemplary state update mechanisms.

FIGS. 3A and 3B illustrate state hold mechanisms, and FIGS. 4A and 4B illustrate state update mechanisms. FIGS. 3A and 3B show the state hold mechanisms according to the prior art and the embodiment of the present invention respectively. In the prior art, each cell holds states in 16 bits and opens all states of 16 bits to neighboring cells, as shown in FIG. 3A. In the embodiment of the present invention, on the other hand, each cell opens only eight among 16 bits to the neighboring cells while closing the remaining eight bits, as shown in FIG. 3B.

On the other hand, the conventional state update mechanism receives 16 bits from each of its own cell and the neighboring cells and derives an output of 16 bits as shown in FIG. 4A, while that according to the embodiment is partitioned into two, i.e., closed and open parts each receiving eight bits from each of its own cell and the neighboring cells and deriving an output of eight bits. Thus, the state hold mechanism 4 and the state update mechanism 5 are partitioned into closed and open parts, whereby these mechanisms can be simplified.

Figure 5:
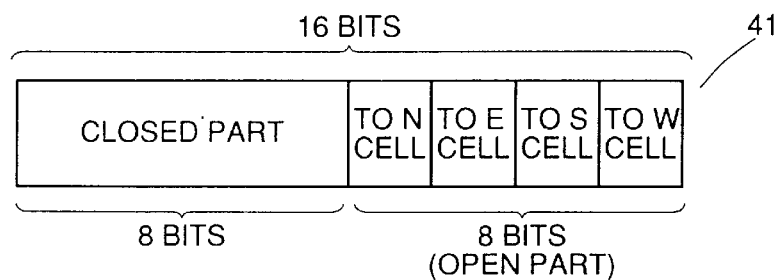
FIG. 5 is a block diagram showing a state hold mechanism according to a second embodiment of the present invention.

FIG. 5 is a block diagram showing a state hold mechanism 41 according to a second embodiment of the present invention. Referring to FIG. 5, the state hold mechanism 41 consists of eight closed bits and four open parts of two bits corresponding to four neighbors, i.e., N, E, S and W cells respectively.

Figure 6A:
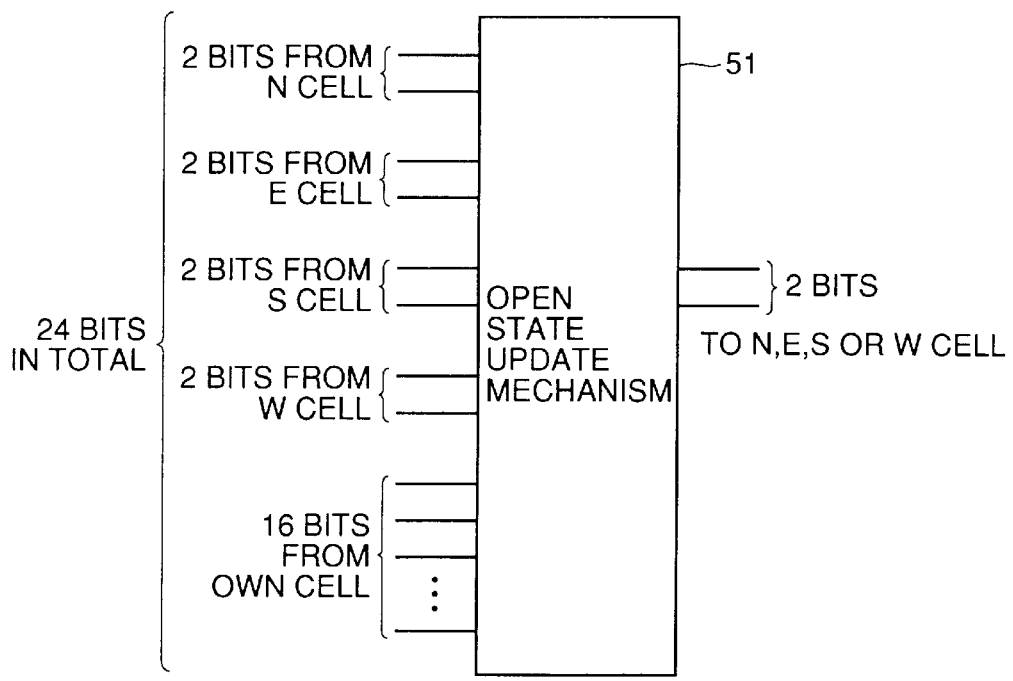
FIGS. 6A and 6B are block diagrams showing state update mechanisms according to the second embodiment of the present invention.
Figure 6B:
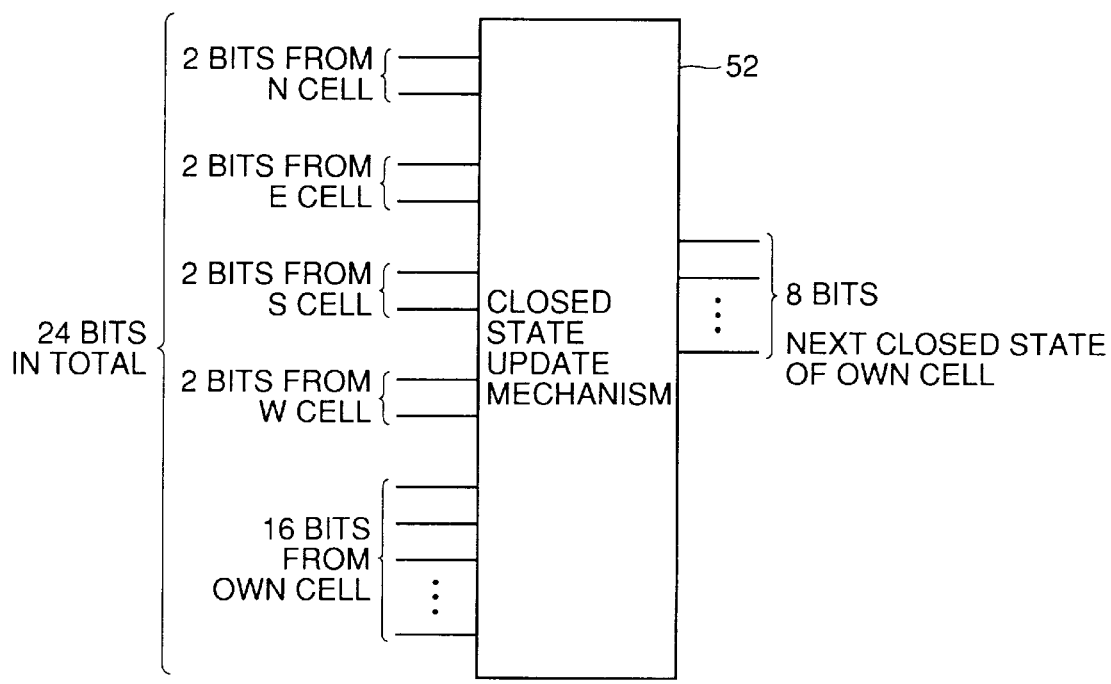

FIGS. 6A and 6B illustrate a state update mechanism according to the second embodiment of the present invention. This state update mechanism consists of an open state update mechanism 51 shown in FIG. 6A and a closed state update mechanism 52 shown in FIG. 6B. Four open state update mechanisms 51 are provided so that each outputs two bits to each of the N, E, S and W cells with an input of 24 bits in total, and a single closed state update mechanism 52 is provided for bringing 8-bit data into a next closed state of its own cell with an input of 24 bits in total.

Figure 7:
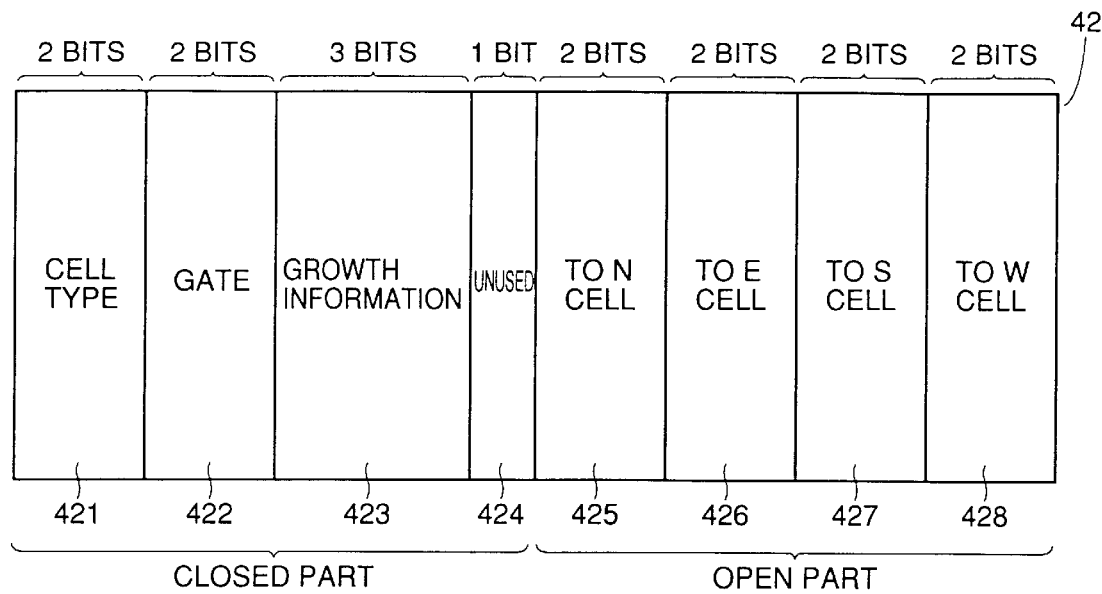
FIG. 7 is a block diagram showing a state hold mechanism according to a third embodiment of the present invention.

FIG. 7 is a block diagram showing a state hold mechanism 42 according to a third embodiment of the present invention. Similarly to the state hold mechanism 41 shown in FIG. 5, the state hold mechanism 42 shown in FIG. 7 consists of an open part formed by four parts of two bits and a closed part formed by a cell type part 421 of two bits, a gate part 422 of two bits, a growth information part 423 of three bits and an unused part 424 of one bit.

The closed parts shown in FIG. 7 are signified as follows:
The following information is set in the cell type part 421:
00=0: blank cell
01=1: axon cell
10=2: dendrite cell
11=3: neuron cell A blank cell causes no growth or the like, and an axon cell is in a direction for sending an operation signal from a neuron cell. Namely, the axon cell has an input gate in an upstream direction of operation signal propagation and output gates in the remaining three directions, and outputs the operation signal in the three directions in response to its own state and a state inputted in the input gate. On the other hand, a dendrite cell is adapted to collect operation signals toward a neuron cell. Namely, the dendrite cell has input gates in three upstream directions of operation signal propagation and a single output gate in the destination direction of propagation, for receiving operating signals from the remaining three directions and outputting an operation signal in the single direction in response to its own state and the states of the remaining three cells. A neuron cell serves as the body of a nerve cell.

The following is set in the gate part 422:
00=0: N
01=1: E
10=2: S
11=3: W

N, E, S and W express north, east, south and west, each indicating the direction of the single input gate of the axon cell or the single output gate of the dendrite cell.

The following information is set in the growth information part 423:
000=0: stop growth
100=4: turn left
010=2: grow straight
001=1: turn right
110=6: split left (split left and forward)
011=3: split right (split right and forward)
101=5: T-split (split left and right)
111=7: three-directional split (split left, forward and right)

Each of open parts 425 to 428 shown in FIG. 7 is signified as follows:
In a growth mode, the following information is set:
00=0: no growth signal
01=1: axon growth signal
10=2: dendrite growth signal
11=3: unused In a functional operation mode, a binary number expressing the strength of a signal is set.

Figure 8:
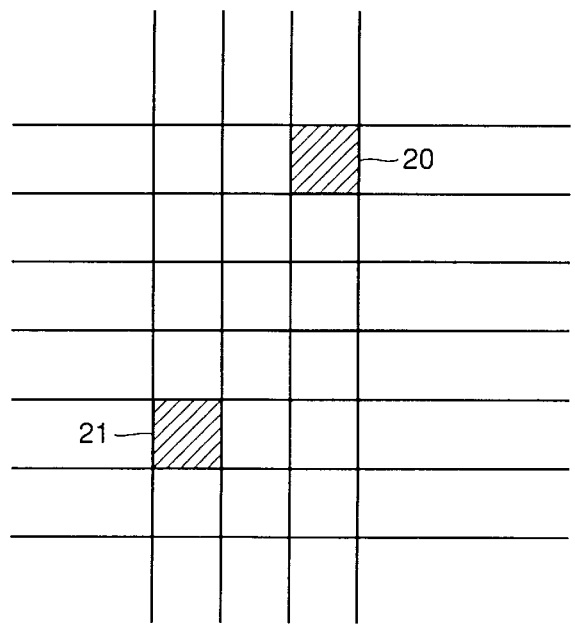
FIG. 8 is adapted to illustrate operations of the third embodiment of the present invention.
Figure 9A:
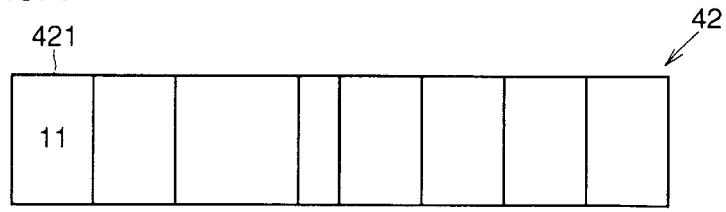
FIGS. 9A to 9D illustrate state changes in state hold mechanisms of neuron cells shown in FIG. 8.
Figure 9B:
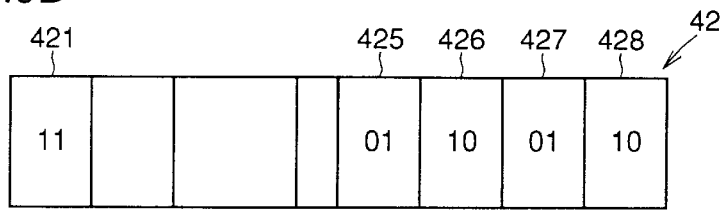
Figure 9C:
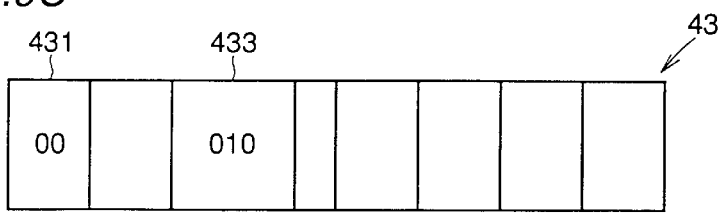
Figure 9D:
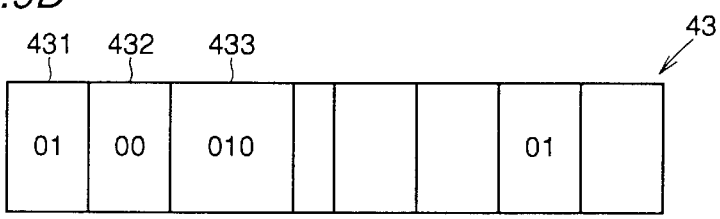
Figure 10:
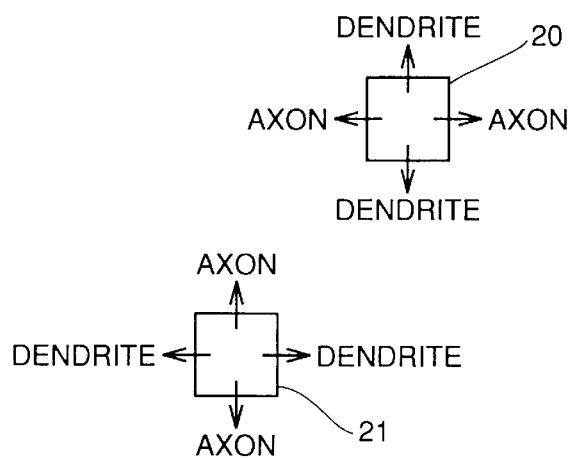
FIG. 10 illustrates the neuron cells outputting growth signals.

FIG. 8 is adapted to illustrate operations of the third embodiment of the present invention, FIGS. 9A to 9D illustrate state changes in the state hold mechanisms of neuron cells shown in FIG. 8, and FIG. 10 illustrates the neuron cells outputting growth signals.

With reference to FIGS. 7 to 10, the operations of the third embodiment according to the present invention are now described. First, it is assumed that two neuron cells 20 and 21 are arranged as shown by slant lines in FIG. 8. The 2-bit cell type part 421 of the state hold mechanism 42 of each of these neuron cells 20 and 21 stores the information 11=3 indicating a neuron cell, as shown in FIG. 9A.

On the other hand, a cell type part 431 of a state hold mechanism 43 of each cell other than the neuron cells 20 and 21 stores the information 00=0 indicating a blank cell, as shown in FIG. 9C. Further, the information 010=2 indicating straight growth or the like is set in a growth information part 433 of the state hold mechanism 43 of the cell other than the neuron cells 20 and 21, as shown in FIG. 9C.

The two neuron cells 20 and 21 shown in FIG. 8 output growth signals as shown in FIG. 10, for example. In the neuron cell 21, the information 01=1 indicating an axon growth signal is set in the open parts 425 and 427 for N and S cells, and the information 10=2 indicating a dendrite growth signal is set in the open parts 426 and 428 for E and W cells in the state hold mechanism 42 shown in FIG. 9B. Therefore, the neuron cell 21 outputs the growth signals as shown in FIG. 10. Namely, the neuron cell 21 outputs axon growth signals in the directions N and S, and dendrite growth signals in the directions E and W.

FIG. 9D shows an operation of an S cell for the neuron cell 21 shown in FIG. 10, receiving the axon growth signal. First, the information in the cell type part 431 changes from 00=0 indicating a blank cell to 01=1 indicating an axon cell. This cell receives the growth signal from the north side, and hence the information 00=0 indicating N is set in a gate part 432. Further, the growth information for this cell is straight growth, and hence the same axon growth information 01 as that received from the open part 427 for the S cell is supplied. This growth advances in a chained manner.

Figure 11:
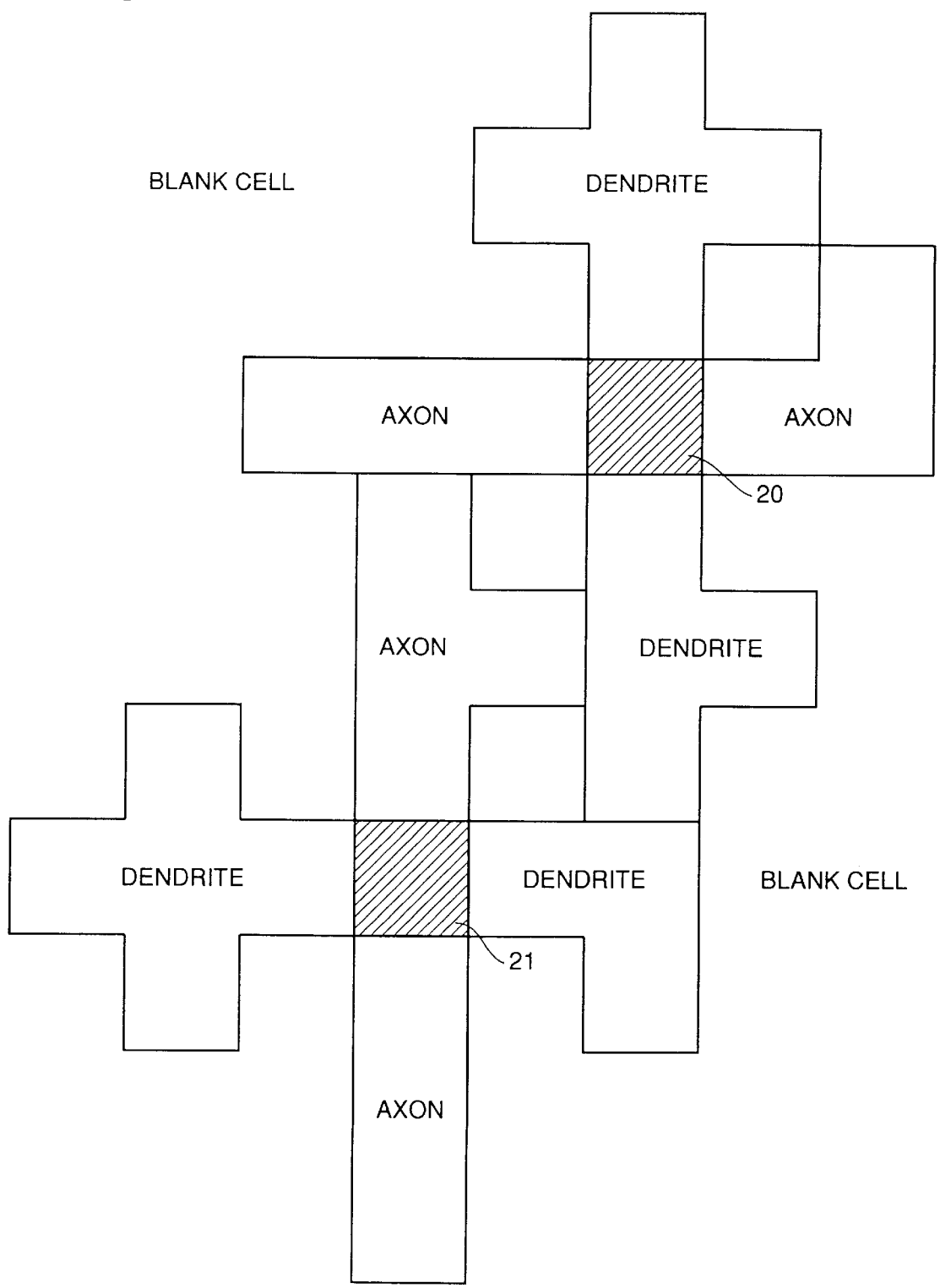
FIG. 11 illustrates the neuron cells shown in FIG. 10 growing axons and dendrites.

FIG. 11 illustrates the neuron cells 20 and 21 shown in FIG. 10 growing axons and dendrites. As shown in FIG. 11, all cells on a cellular automaton are classified into four types, i.e., blank, axon, dendrite and neuron cells. This classification is decided by the value of the cell type part 421 of the state hold mechanism 42 shown in FIG. 7.

Figure 12:
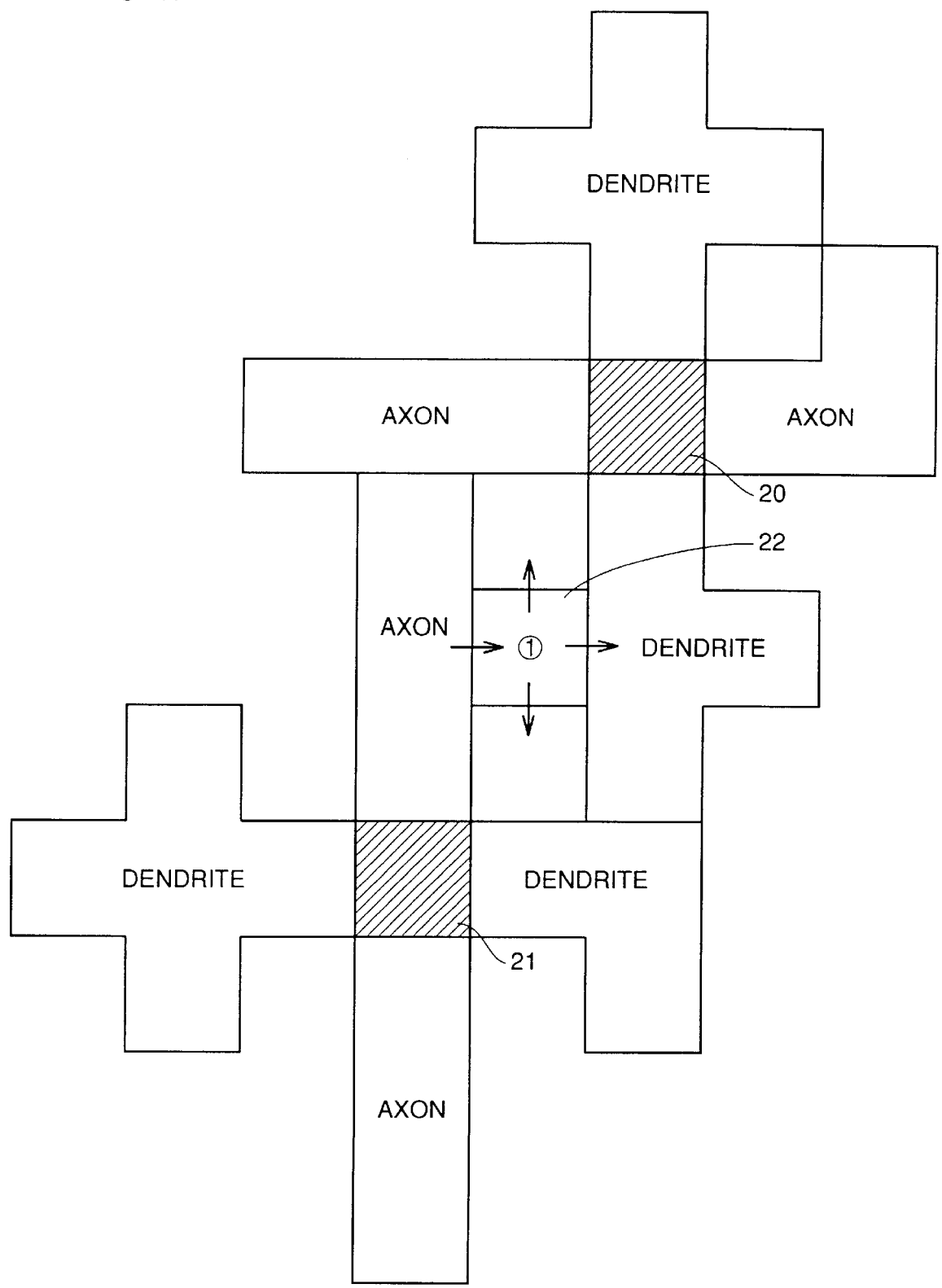
FIG. 12 illustrates growth of an axon cell.
Figure 13:
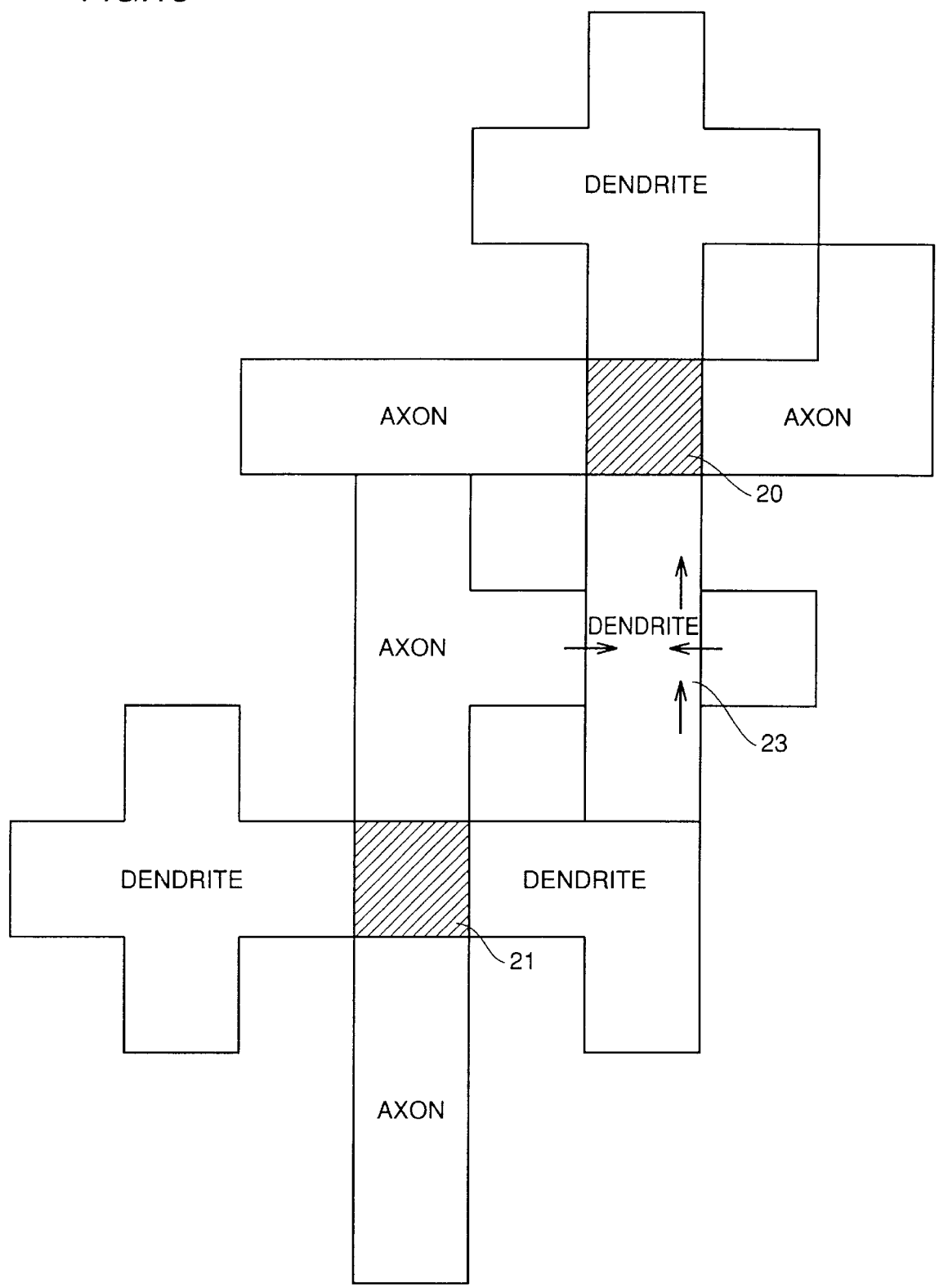
FIG. 13 illustrates growth of a dendrite cell.

FIGS. 12 and 13 show operation signal propagation of axon and dendrite cells respectively. An input gate of an axon cell 22 shown in FIG. 12 is formed by the W cell, and this is decided by setting the information 11=3 indicating W in the gate part 422 shown in FIG. 7. This axon cell 22 sets a signal received from the W cell in the open parts 425 to 427 for the N, E and S cells as such. Namely, the axon cell 22 has a mechanism of updating open states corresponding to cells other than the gate cell on the basis of its own cell state and the value of the open part of the gate cell.

On the other hand, an output gate of a dendrite cell 23 shown in FIG. 13 is formed by the N cell. This is decided by setting the information 00=0 indicating N in the gate part 422 shown in FIG. 7. This dendrite cell 23 has an update mechanism performing operations on the basis of signals received from the E, S and W cells and setting the result in the open part 425 for the N cell.

A genetic algorithm is now described. For example, it is assumed that growth information in neuron cells and blank cells and the like are first set in the cellular automata 2a, 2b and 2c in random initial states. The cellular automata 2a, 2b and 2c set in random initial states operate in growth modes, to form a certain neural network. The cellular automata 2a, 2b and 2c forming the certain neural network are driven in functional operation modes, so that the evaluation part 8 compares the signals 9a, 9b and 9c expressing the output results thereof with the signal 7 and inputs the signal 10 expressing the evaluation value in the evaluation reflecting part 11. The evaluation reflecting part 11 selects two cellular automata to be evaluated, and decides the initial states such as the growth information in the neuron cells and blank cells of the cellular automata 2a, 2b and 2c. This decision is set on the basis of the initial states of the two cellular automata to be evaluated in a state recombining the initial state of the remaining cellular automaton every part of the initial states of the two cellular automata with a small amount of random alteration. Then, the process of growing and functionally driving the cellular automata 2a, 2b and 2c is performed again. This process is so repeated that the considerable difference between the initial states of the cellular automata 2a, 2b and 2c at the beginning is gradually reduced and the cellular automata 2a, 2b and 2c enter states suitable for the object problem.

According to each embodiment of the present invention, as hereabove described, each state update/storage means is provided with parts which are open and closed to the remaining cells respectively while the open part is partitioned into those for the remaining cells for deciding a next state on the basis of its own cell state and the states of the neighboring cells which are open to its own cell, whereby a neural network can be formed in high density with no unnecessary interference between signal propagation paths.

Further, the cells can be so grown that an axon cell is in a direction for sending a signal from a neuron cell, and the state can be so updated that a dendrite cell collects signals toward a neuron cell.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A neurocellular automaton provided with a number of cells, each having state storage means holding a state, being arranged in the form of a grid, each said cell comprising state update means updating the next state on the basis of the current state of its own cell being held in said state storage means and states of neighboring cells while synchronously updating states of all said cells, said state storage means including closed storage means closing its own state to remaining said cells and open state storage means opening its own state to said remaining cells, said state update means including closed and open update means corresponding to said closed and open storage means respectively, for deciding said next state on the basis of its own cell state and open states of said neighboring cells.

2. The neurocellular automaton in accordance with claim 1, wherein said open state storage means includes a partial storage area storing an open state in correspondence to each of said neighboring cells, and said state update means includes partial update means performing partial updating in correspondence to said partial storage area, said partial update means deciding said next state on the basis of its own cell state and open states corresponding to its own cell being stored in said partial storage areas of said neighboring cells.

3. The neurocellular automaton in accordance with claim 2, wherein said cells include a plurality of neuron cells corresponding to bodies of nerve cells and a blank cell causing no generation or the like, a blank state is stored in said state storage means, an axon growth signal or a dendrite growth signal corresponding to an axon or a dendrite of each said nerve cell is set in a part or said open state storage means of each said neuron cell, and said cell of said blank state receiving said axon or dendrite growth signal from a neighboring cell stores said growth signal from said neighboring cell in said closed state storage means thereby changing from said blank cell to an axon or dendrite cell in response to received said signal and setting said received growth signal in said open state storage means for remaining cells other than said neighboring cell in accordance with previously held growth information.

4. The neurocellular automaton in accordance with claim 3, wherein said cells are classified into said neuron cells, said blank cell, said axon cell and said dendrite cell, said axon cell is in a direction for sending functional operation signals from said neuron cells, and said dendrite cell collects functional operation signals toward said neuron cells.

5. The neurocellular automaton in accordance with claim 4, wherein said axon cell has an input gate in a single direction for receiving a signal and output gates in all remaining directions for outputting a functional operation signal to each said output gate in response to its own state and a functional operation signal being inputted in said input gate, and said dendrite cell has an output gate in a single direction for outputting a signal and input gates in all remaining directions for outputting a functional operation signal in said single direction in response to its own state and a functional operation signal being inputted in each said input gate.

6. The neurocellular automaton in accordance with claim 3, further having two modes, i.e., a growth mode and a functional operation mode, for classifying said cells into said neuron cells, said blank cell, said axon cell and said dendrite cell in said growth mode, while said axon cell distributes a functional operation signal and said dendrite cell collects said functional operation signal in said functional operation mode.

7. An optimizer employing a neurocellular automaton being formed by arranging a plurality of cells in the form of a grid and interconnecting the same with each other to be capable of inputting signals expressing states of neighboring cells in each said cell as input signals, each said cell including:

state storage means including open and closed parts of its own cell state, and state update means corresponding to said parts of said state storage means for deciding a next state on the basis of its own cell state and open states of said neighboring cells, said optimizer comprising:

an input/output part outputting an object problem to said neurocellular automaton and receiving an output result of said neurocellular automaton being responsive thereto;

an evaluation part comparing said object problem with said output result of said neurocellular automaton for calculating an evaluation value being the fitness of said neurocellular automaton to said object problem; and an evaluation value reflecting part deciding the next operation in next said state update means in said neurocellular automaton and inputting respective signals expressing the same in said neurocellular automaton, said state storage means and said state update means.

8. The optimizer employing a neurocellular automaton in accordance with claim 7, wherein a genetic algorithm is employed for said evaluation value reflecting part.

9. A method of updating a neurocellular automaton provided with a number of cells, said cells being arranged in a form of a grid, each of said cells storing a state including a closed bit and an open bit, said method comprising:

deciding next states for the cells based on the state of each said cell and the open bits of neighboring cells but not on the basis of the closed bits of the neighboring cells; and synchronously updating states of all said cells to the decided next states.

* * * * *